US007702746B2

(12) United States Patent
Conner et al.

(10) Patent No.: US 7,702,746 B2
(45) Date of Patent: Apr. 20, 2010

(54) WEB SERVICES RESPONSE TEMPLATES

(75) Inventors: Michael Haden Conner, Austin, TX (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 1362 days.

(21) Appl. No.: 11/111,505

(22) Filed: Apr. 21, 2005

(65) Prior Publication Data

US 2006/0242162 A1    Oct. 26, 2006

(51) Int. Cl.
    *G06F 15/173*    (2006.01)
(52) U.S. Cl. ..................................... 709/217
(58) Field of Classification Search .............. 709/217, 709/203
See application file for complete search history.

(56) References Cited

U.S. PATENT DOCUMENTS

| | | | | |
|---|---|---|---|---|
| 6,243,737 B1 * | 6/2001 | Flanagan et al. | ............ | 709/202 |
| 6,324,521 B1 * | 11/2001 | Shiota et al. | ................. | 705/27 |
| 6,835,884 B2 * | 12/2004 | Iwamoto et al. | .............. | 84/609 |
| 6,947,979 B1 * | 9/2005 | Pon | ............................. | 709/223 |
| 7,047,286 B2 * | 5/2006 | Hill et al. | .................... | 709/220 |
| 7,331,038 B1 * | 2/2008 | Snodgrass et al. | ........... | 717/123 |

* cited by examiner

Primary Examiner—David Y Eng
(74) *Attorney, Agent, or Firm*—Jill Poimboeuf; Gregory K Goshorn; Greg Goshorn, P.C.

(57) ABSTRACT

Provided is a Web Services Response Template (WSRT) that addresses the problems of efficiency and robustness to change in Web Services response by allowing a requestor to explicitly specify, in a response template what information is to be returned by the request. A requestor of a web service gets just the information it needs; different requestors of the same operation may get different information; and a responder sends the requestor only what is asked for so there is no problem when new information becomes available. WSRTs are specifically designed to allow the type of control needed in program-to-program (P2P) communication, while being very efficiently and simply processed by a web service. Thus, WSRTs address difficulties that arise in typical distributed, P2P communication without adding much overhead or complexity to either a service requester or a service provider. The efficiency and flexibility afforded by WSRTs is essential to emerging enterprise architectures based on SOA (Service Oriented Architecture).

12 Claims, 8 Drawing Sheets

WEB SERVICES RESPONSE TEMPLATES

TECHNICAL FIELD

The present invention relates generally to web services and, more specifically, to system that provides client-customizable web services templates.

BACKGROUND OF THE INVENTION

During the past decade, the Internet has grown exponentially both with regard to the number of users and the types of services offered. Some area of interest is human to program communications that enable users to order and sell products, conduct research, place telephone calls, query online databases, and so on. These functions can be grouped user the term "web interactions." Another area of interest is program-to-program (P2P) communication via a set of standards such as simple object access protocol (SOAP), hyper text transfer protocol (HTTP) and web services description language (WSDL). These functions can be grouped under the term "web services."

Currently, many web services decouple various component parts or aspects of an implementation from each other to provide modularity in development, testing, deployment and use. Examples of decoupled web service aspects include, but are not limited to, transport, platform, programming language, and component implementation design. However, typically web services do not decouple components with respect to issues such as changing requirements relating to more or less information and changes to the web service's information model This issue creates a "response conundrum," which includes the following aspects:

Difficulty with efficiency; When responding to a request for information, there are basically two choices:
1. A web service may return everything available which results in message bloat, and unnecessary data retrieval.
2. A web service may return very specific information which results too many requests being sent in order for the requestor to get all its required information.

Difficulty managing change; When new information becomes available from a web service, there are two choices:
1. A service can return it in the response to existing requests, which risks breaking client software and raises efficiency issue 1 above.
2. A service can add new requests which results in interface bloat, and efficiency issue 2 above.

The response conundrum is a long standing problem that has never been well addressed in a program-to-program (P2P) communication area. In the database (DB) area this problem is solved by a structured query language (SQL) query sent to a DB. SQL enables a requester to both control the amount and form of the query results and to be isolated (assuming the query follows good practices) from many extensions or other modifications that might occur to the target DB. However, this approach is not practical for general P2P communication as DB query languages are typically too complex for applications to process effectively.

Several acronyms are used in this Specification within an exemplary architecture that supports the claimed subject matter. The acronyms are as follows:

XML: Short for Extensible Markup Language, a specification developed by the World Wide Web Consortium (W3C). XML is a pared-down version of standard generalized markup language (SGML), designed especially for Internet, or web, documents. It allows designers to create their own customized tags, enabling the definition, transmission, validation, and interpretation of data between applications and between organizations.

UML: Short for Unified Modeling Language, a general-purpose notational language for specifying and visualizing complex software, especially large, object-oriented projects. UML builds on previous notational methods such as Booch, OMT, and OOSE.

WSDL: Short for Web Services Description Language, an XML-formatted language used to describe a web service's capabilities as collections of communication endpoints capable of exchanging messages. WSDL is an integral part of UDDI, an XML-based worldwide business registry. WSDL is the language that UDDI uses. WSDL was developed jointly by the Microsoft Corporation of Redmond, Wash. and International Business Machines Corp. (IBM) of Armonk, N.Y.

XMI: Short for XML Metadata Interchange, an XML application that facilitates the standardized interchange of object models and metadata over the Internet among groups working in team development environments using tools and applications from multiple vendors. XMI also can be used to exchange information about data warehouses. XMI is based on three industry standards—XML, UML, and MOF (an OMG modeling and metadata repository standard). The architecture enables tools to share metadata programmatically using XML or common object request broker architecture (CORBA) interfaces specified in the UML or MOF standards.

What is needed is a method to allow Web Services requesters to control the form and quantity of information returned and of isolating a requester from changes in the provider's information model until the requestor's implementation is evolved to support the changes.

SUMMARY OF THE INVENTION

Provided is a Web Services Response Template (WSRT) that addresses the above mentioned issues by allowing a requestor to explicitly specify, in a response template included in each request, what information is to be returned by the request. This means:

A requestor of a web service gets just the information it needs, no more, no less.

Different requesters of the same operation may get different information.

A responder sends the requestor only what is asked for so there is no problem when new information becomes available; information is sent as soon as requested, but not before.

WSRTs are specifically designed to allow the type of control needed in program-to-program (P2P) communication, while being very efficiently and simply processed by a web service. Thus WSRTs address age-old, and very serious difficulties that arise in typical distributed, P2P communication without adding much overhead or complexity to either a service requestor or a service provider. The efficiency and flexibility afforded by WSRTs is essential to emerging enterprise architectures based on SOA (Service Oriented Architecture).

BRIEF DESCRIPTION OF THE DRAWINGS

A better understanding of the present invention can be obtained when the following detailed description of the disclosed embodiments is considered in conjunction with the following drawings.

DETAILED DESCRIPTION OF THE FIGURES

Although described with particular reference to a Java-based web service, the claimed subject matter can be implemented in any web service architecture in which the decoupling of requests and responses and is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
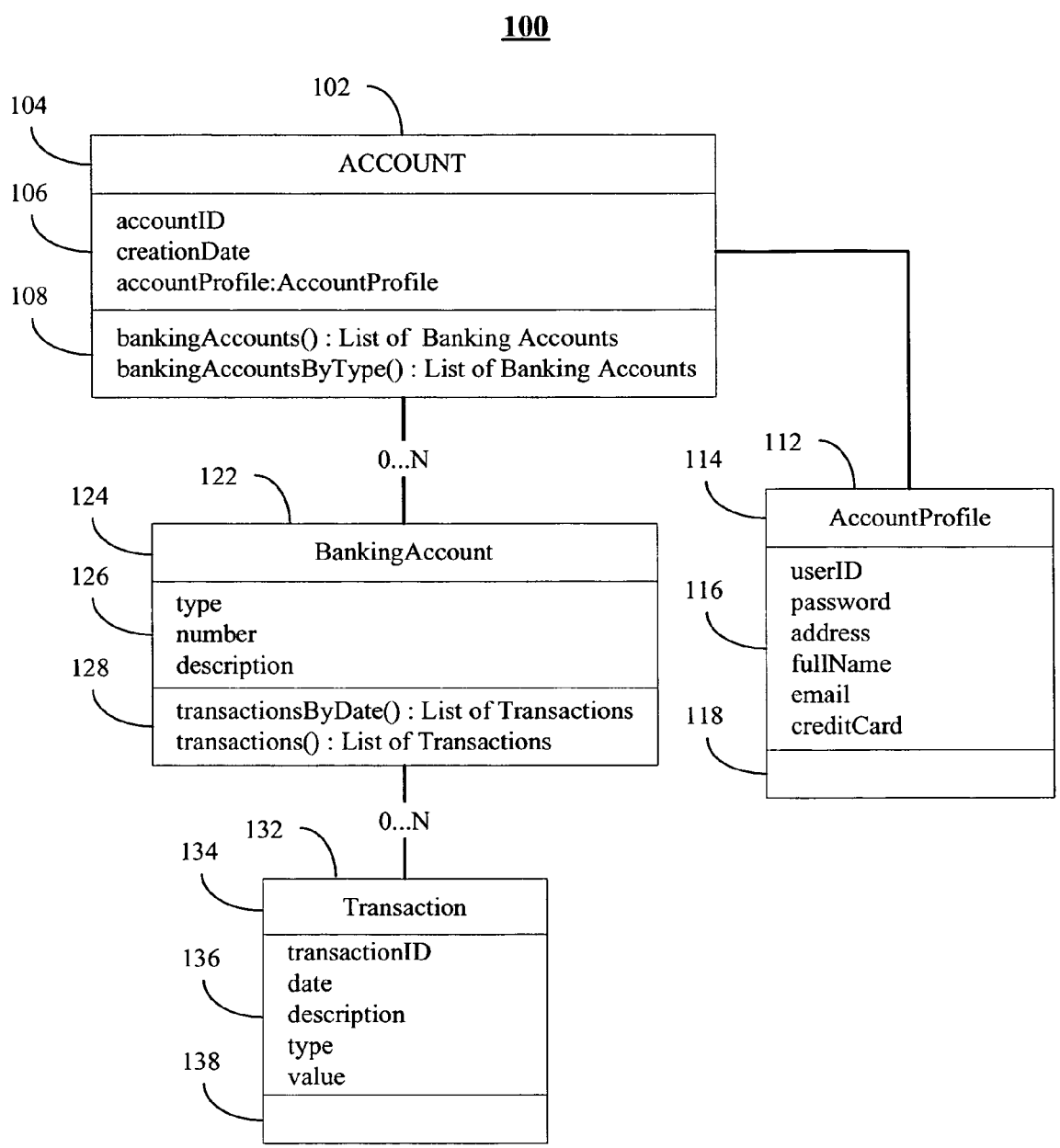
FIG. 1 is an exemplary information model used throughout the remainder of the Specification to explain the claimed subject matter.

FIG. 1 is an exemplary information model 100 used throughout the remainder of the Specification to describe and explain the claimed subject matter. Model 100 includes four (4) data object classes: an Account object 102; an AccountProfile object class 112; a BankAccount object class 122; and a Transaction object class 132. An instantiation of Account class 102 is associated with a single instantiation of AccountProfile class 112 and zero through N number (0 . . . N) of instantiations of BankAccount class 122. Each instantiation of BankAccount class 122 is associated with zero through N number (0 . . . N) of instantiations of Transaction class 132.

Account object 102 includes an object name 104, or "Account," a number of attributes, or data elements, 106 and a number of methods, or functions, 108. Data elements 106 include an "accountID" attribute, a "creationDate" attribute and an "accountProfile" attribute. AccountID attribute uniquely identifies a particular instantiation of object 102. CreationDate attribute stores information relating to the date and time a particular instantiation of class 102 was created. AccountProfile attribute is an associated instantiation of AccountProfile class 112 that stores information related to the corresponding instantiation of object 102.

Account 102 functions, or "methods," 108 include a "bankingAccounts" method and a "bankingAccountsByType" method. BankingAccounts method takes no arguments and includes logic to return a list of bankingAccount objects 122 associated with a particular instantiation of account object 102. In other words, bankingAccounts method is called by a particular instantiation of account object 102 and returns a list of bankingAccount objects 122 associated with the object 102 that generated the call. In a similar fashion, bankingAccountsByType method returns the bankingAccount 122 associated with a calling Account object 102 with the returned objects 122 sorted by type, which is an attribute 126 of object 122.

An accountProfile object 112 includes an object name 114, or "AccountProfile," a number of attributes, or data elements, 116 and, in this example no methods, or functions, 118. Data elements 116 include a "userID" attribute, a "password" attribute, an "address" attribute, a "fullName" attribute, and "email" attribute and an "creditCard" attribute. As mentioned above, there is a one-to-one relationship between an instantiation of an object 102 and an object 112. Attributes 116 of a particular instantiation of object 112 serve to identify a person or business associated with the corresponding instantiation of account object 102. Attributes 116 are self-explanatory and are merely listed for the purposes of illustration, having no particular significance to the claimed subject matter.

BankingAccount object 122 includes an object name 124, or "BankingAccount," a number of attributes, or data elements, 126 and a number of methods, or functions, 128. Data elements 126 include a "type" attribute, a "number" attribute and a "description" attribute. As mentioned above, there is a one-to-many relationship between an instantiation of an object 102 and an object 122. Type attribute describes an account type of a corresponding instantiation of bankingAccount 122. Examples of type of account include, but are not limited to, checking accounts, savings account and loan accounts. In this example, type attribute is employed by bankingAccountsByType method of account 102 to sort bankingAccount 122. Number Attribute stores information that enables a particular instantiation of bankingAccount 122 to be identified; i.e. an account number. Description attribute is a data field that stores descriptive information about a corresponding bankingAccount 122.

BankingAccount 122 functions, or "methods," 128 include a "transactions" method and a "transactionsByDate" method. Transactions method takes no arguments and includes logic to return a list of transaction objects 132 associated with a particular instantiation of bankingAccount object 122. In other words, bankingAccounts method is called by a particular instantiation of bankingAccount object 122 and returns a list of transaction objects 132 associated with the object 122 that generated the call. In a similar fashion, tranactionsByDate method returns the transactions 132 associated with a calling bankingAccount object 122 with the returned objects 132 sorted by date, which is an attribute 136 of object 132.

Each instantiation of bankingAccount 122 may be associated with a number, or "0 . . . N," transactions 132. Transaction object 132 includes an object name 134, or "Transaction," a number of attributes, or data elements, 136 and, in this example no methods, or functions, 138. Data elements 136 include an "transactionID" attribute, a "date" attribute, a "description" attribute, a "type" attribute and a "value" attribute. For the most part, attributes 136 are self-explanatory and are merely listed for the purposes of illustration, having no particular significance to the claimed subject matter. In this example, date attribute is employed by transactionsByDate method of bankkingAccount 122 to sort transactions 132.

It should be noted that information model 100 is used for illustrative purposes only and is not intended to limit the scope of the claimed subject matter. Those with skill in the computing arts should recognize that the claimed subject matter is applicable in almost any subject area other than banking and bank accounts. In addition, information model 100 is not intended to show a working information model for the banking industry. Of course, such a model would necessarily be much more complex with different and additional classes, attributes and methods.

Figure 2:
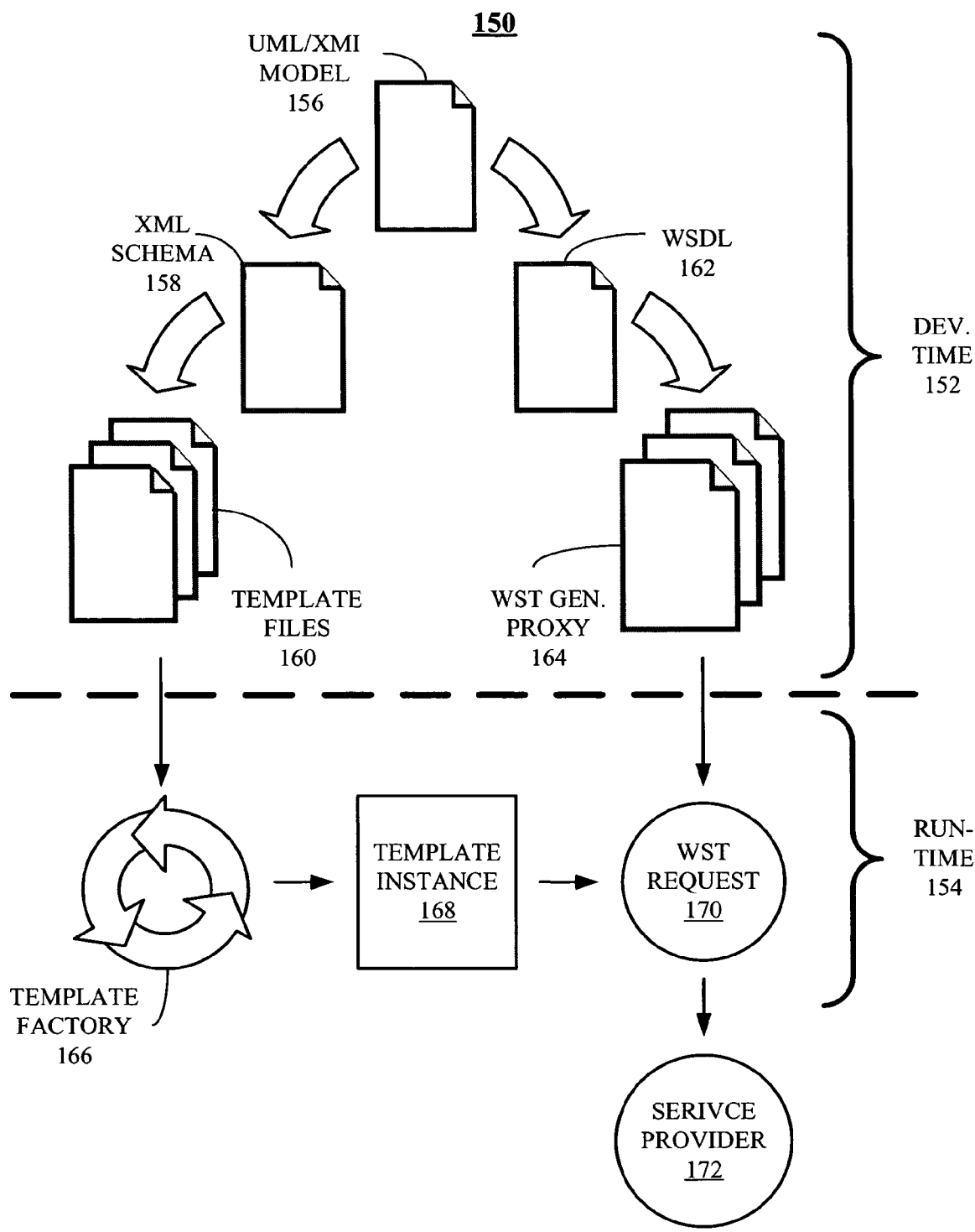
FIG. 2 is a block diagram of a client-side programming pattern for the web services response templates (WSRTs) of the claimed subject matter.

FIG. 2 is a block diagram of a client-side programming pattern, or template schema, for the web services response templates (WSRTs) of the claimed subject matter. During a development time 152, a unified modeling language (UML), such as information model 100 described above in conjunction with FIG. 1, or an extensible markup language (XML) metadata interchange (XMI) document 156 is employed to generate an XML scheme document 158 by means of supplied "helper code," or web services template (WST) tooling (not shown). XML schema 158 is then employed by client-side developers to generate template files 160.

Also during development time 152, UML/XMI document 156 is employed to generate a web services descriptor language (WSDL) document 162. Like XML schema 158, WSDL document 162 is generated using WST tooling. WSDL document 162 is then employed by client-side developers, using WSDLs Java and WST tooling, to generate WST generated access code, or proxy, 164. Java is a programming language published by Sun Microsystems, Inc. of Santa Clara Calif.

During a run-time phase 154, template files 160, which are deployed in a template factory 166 are employed by client-side developers code to generate a template instance 168, which is a modified template file 160 designed to fit the client current needs and mirror a particular information model, in this example, UML information model 100. Template instance 168 is then modified, based upon WST generated proxy 164, by client-side code to create a WST request 170, which is then transmitted to a targeted web service 172. Standard web services covert WST request 170 into serialized XML messages that are transmitted to the particular service provider 172.

Figure 3:
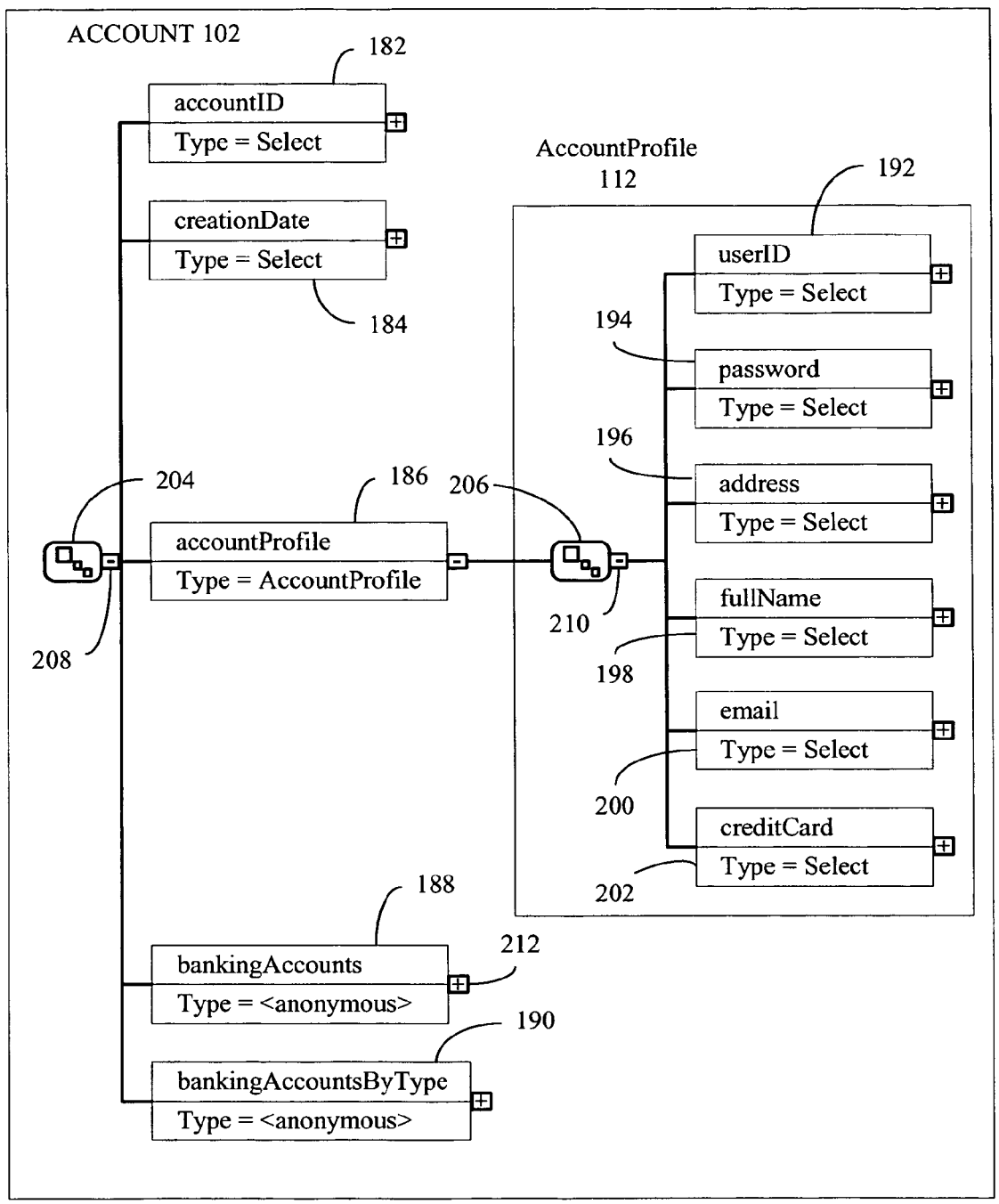
FIG. 3 is a graphical depiction of an Extensible Markup Language (XML) scheme produced from the information model of FIG. 1.

FIG. 3 is a first portion 180 of a graphical depiction of an Extensible Markup Language (XML) schema produced from UML information model 100 of FIG. 1. Schema 180 includes account class 102 and accountProfile class 112 first introduced above in FIG. 1. As stated above, account 102 includes an accounted attribute 182, which is of type "select." An attribute of type select indicates that the corresponding attribute may be employed in a query of the instantiated records, in this example class 102, to filter particular records. In other words, a query on the relevant database can request a record or records with particular accounted attributes 182 that match a specific value, list of values or range of values.

Account 102 also includes a creationDate attribute 184, which is of type select, an accountProfile attribute 186, which is of type "AccountProfile." i.e. represents a collection of AccountProfile objects 112. As illustrated in conjunction with FIG. 1, account object 102 includes a bankingAccounts method 188, which is of type anonymous," and a bankingAccountsByType method 190, which is of type anonymous. A method of type anonymous indicates that the element's type is defined in-line, i.e. the element may take on different types depending upon the context in which it is used.

AccountProfile class 112 includes userID attribute 192, which is of type select, password attribute 194, which is of type select, address attribute 196, which is of type select, fullName attribute 198, which is of type select, email attribute 200, which is of type select, and creditCard attribute 202, which is of type select.

Some notations employed throughout schemas 180, 220 (see FIG. 4) and 240 (see FIG. 5) include symbols such as symbols 204 and 206, which indicate that a particular branch consists of elements or attributes that may be displayed in no particular order. Symbols such as symbols 208 and 210, which incorporate a '–' symbol, indicate that a particular branch has been expanded into the corresponding element's constituent elements. Symbols such as symbol 212, which incorporates a '+' symbol, indicates that more data is associated with the corresponding element.

Figure 4:
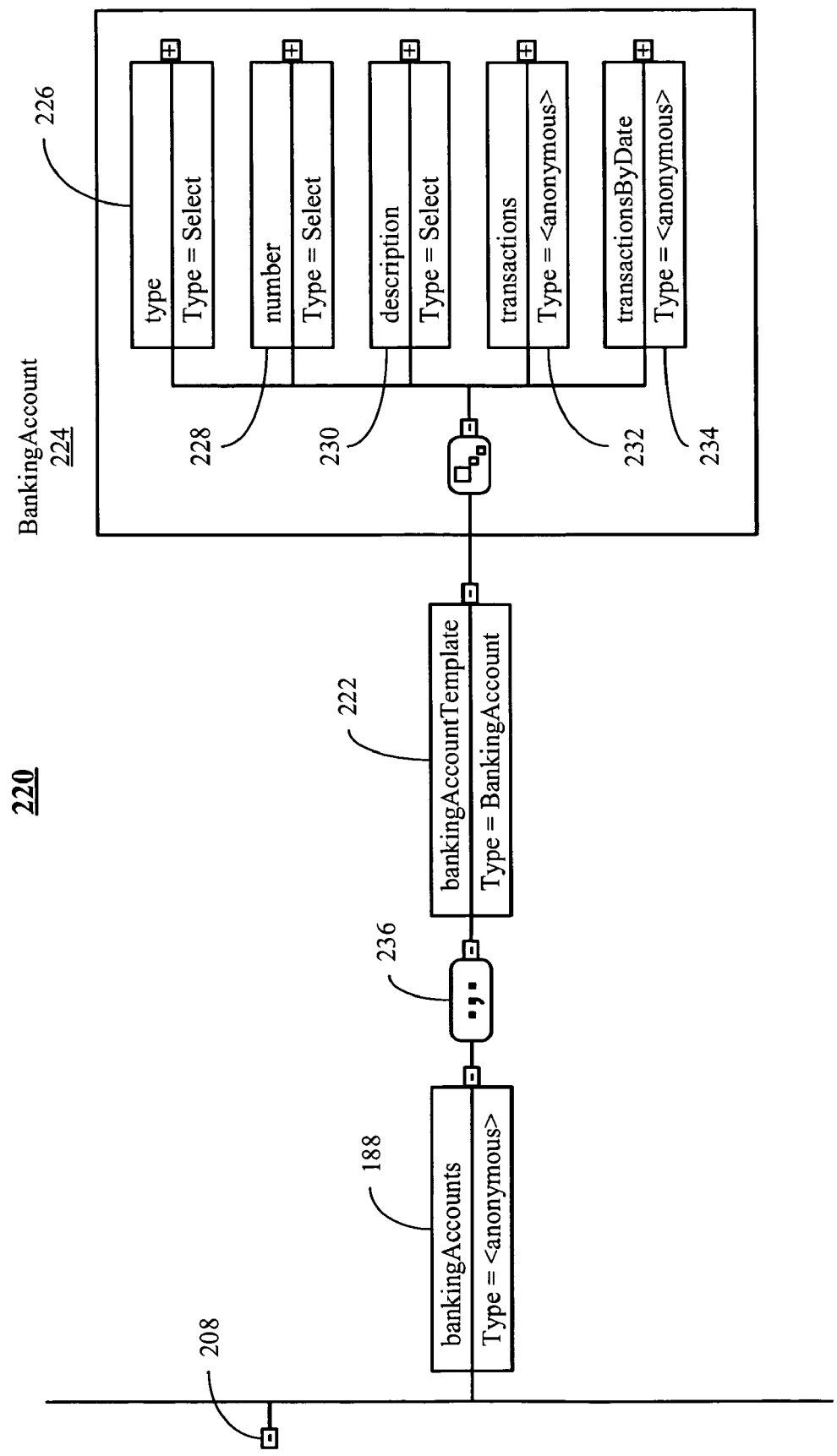
FIG. 4 is further graphical depiction of the XML schema introduced in FIG. 3 and produced from the information model of FIG. 1.

FIG. 4 is a second portion 220 of the graphical depiction of the XML schema introduced in FIG. 3 and produced from information model 100 of FIG. 1. The symbol 208 is the same as symbol 208 displayed in FIG. 3 and indicates the relation of schema 220 with respect to schema 180 (FIG. 3). BankingAccounts 188 is also the same as bankAccounts 188 of FIG. 3. The symbol 212 (FIG. 3) has been activated to show an associated bankingAccountTemplate 222. The symbol 236 indicates that the corresponding branch that includes bankingAccountTemplate 222 consists of elements or attributes that must be displayed in a particular order. Using the claimed subject matter, bankingAccountTemplate 222 is used to retrieve, via web services, bankingAccount 224, which is an instantiation of bankingAccount class 122 (FIG. 1). Like bankingAccount 122, bankingAccount 224 includes a type attribute 226, a number attribute 228, a description attribute 230, a transactions method 232 and a transactionsByDate attribute 234. Attributes 226, 228 and 230 are all of type select and methods 232 and 234 are both of type anonymous.

Figure 5:
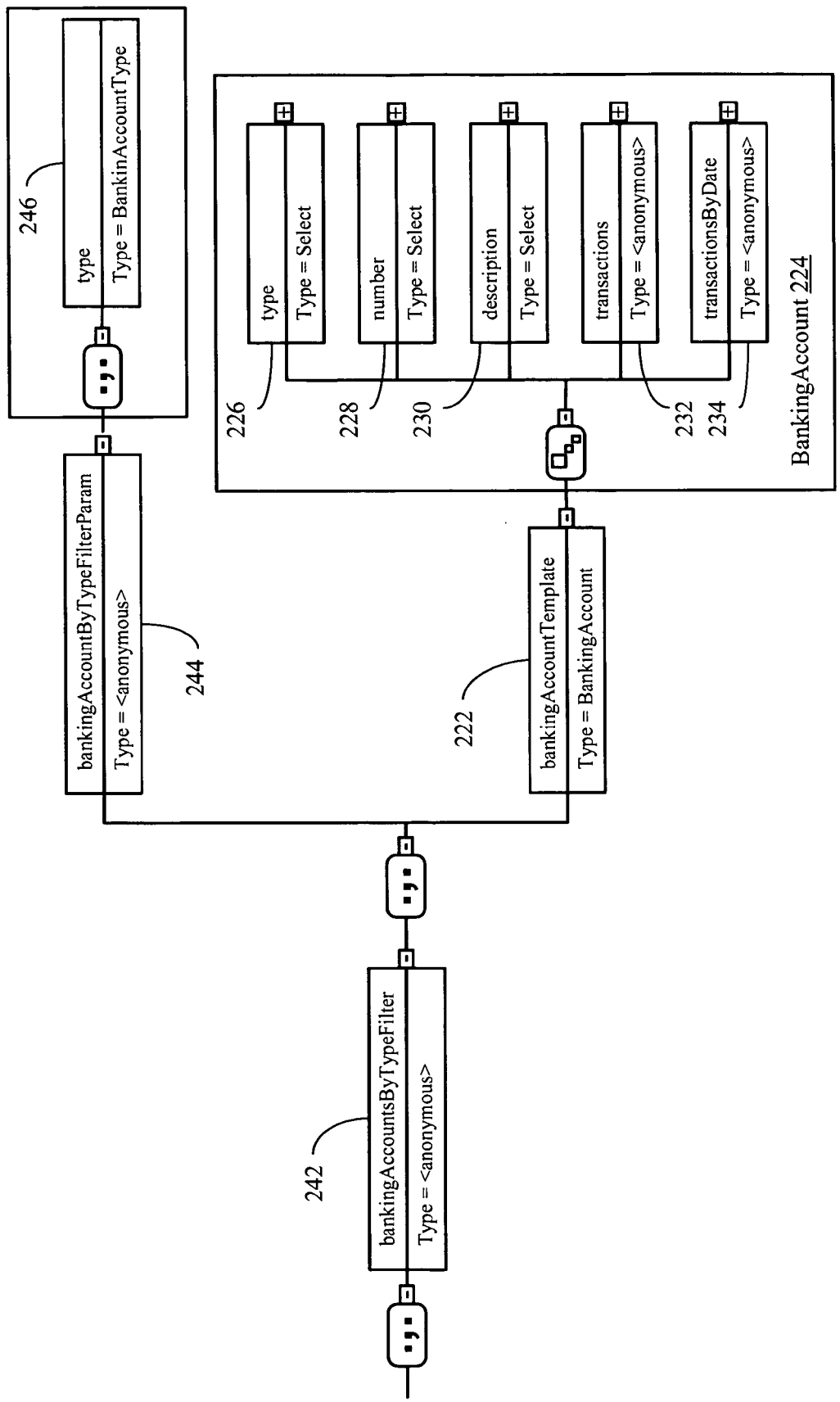
FIG. 5 is further graphical depiction of the XML schema introduced in FIGS. 3 and 4 and produced from the information model of FIG. 1.

FIG. 5 is a third portion 240 of the graphical depiction of the XML schema introduced in FIGS. 3 and 4 and produced from information model 100 of FIG. 1. A bankingAccountsByTypeFilter method 242 is associated with bankingAccountsByType method 190 (FIG. 3). Method 242 is associated with a bankingAccountTemplate 222 (FIG. 4) and a bankingAccountByTypeParam 244. BankingAccountByTypeFilterParam 244, which labels the values of type BankingAccountType used to select the types of banking accounts the method returns. For example, if the value "<type>savings</type><type>credit</type>" is provided then only information about savings and credit accounts and not, say, about checking accounts is returned. BankingAccount 224 is described above in conjunction with FIG. 4.

The following is a sample of a template such as bankingAccountTemplate 222 that conforms to the above schemes 180 (FIG. 3), 220 (FIG. 4) and 240. This schema is designed to specify the template while allowing all elements to be optional. It also illustrates to use of a "filter clause" which is used to specify the amount and format of repeating sections of the information model, in this case the types of accounts the requestor is interested in.

```
<accountTemplate>
    <accountID xmlns="http://request.trade.awsdc.ibm.com" />
    <creationDate xmlns="http://request.trade.awsdc.ibm.com" />
    <accountProfile xmlns="http://request.trade.awsdc.ibm.com">
        <userID />
        <password />
        <email />
        <creditCard />
    </accountProfile>
    <bankingAccountsByType
xmlns="http://request.trade.awsdc.ibm.com">
        <bankingAccountsByTypeFilter>
            <bankingAccountsByTypeFilterParam>
                <type>REGULAR</type>
            </bankingAccountsByTypeFilterParam>
            <bankingAccountTemplate>
                <number />
                <description />
                <transactions>
                    <transactionTemplate>
                        <transactionID />
                        <date />
                        <type />
                        <value />
                    </transactionTemplate>
                </transactions>
            </bankingAccountTemplate>
        </bankingAccountsByTypeFilter>
    </bankingAccountsByType>
</accountTemplate>
```

The following illustrates how WSRTs might be used in client-side code.

```
//Create Request template from a flat file
// (see Account Request XML Template File)
Object   account   =   (com.ibm.awsdc.trade.request.Account)
ts.createRequestfromXML( );
//Add the RequestAccount object to the template
accountT.addElement(account,"account.accountID");
//Change the BankingAccountType
accountT.changeFilterParam(
    "account.bankingAccountsByType.bankingAccountsByTypeFilter[ ]" +
    "bankingAccountsByTypeFilterParam.type",
    com.ibm.awsdc.trade.request.BankingAccountType.REGULAR);
// Invoke the WS
com.ibm.awsdc.trade.response.Account account =
trade.getAccount("123", accountT);
```

Figure 6:
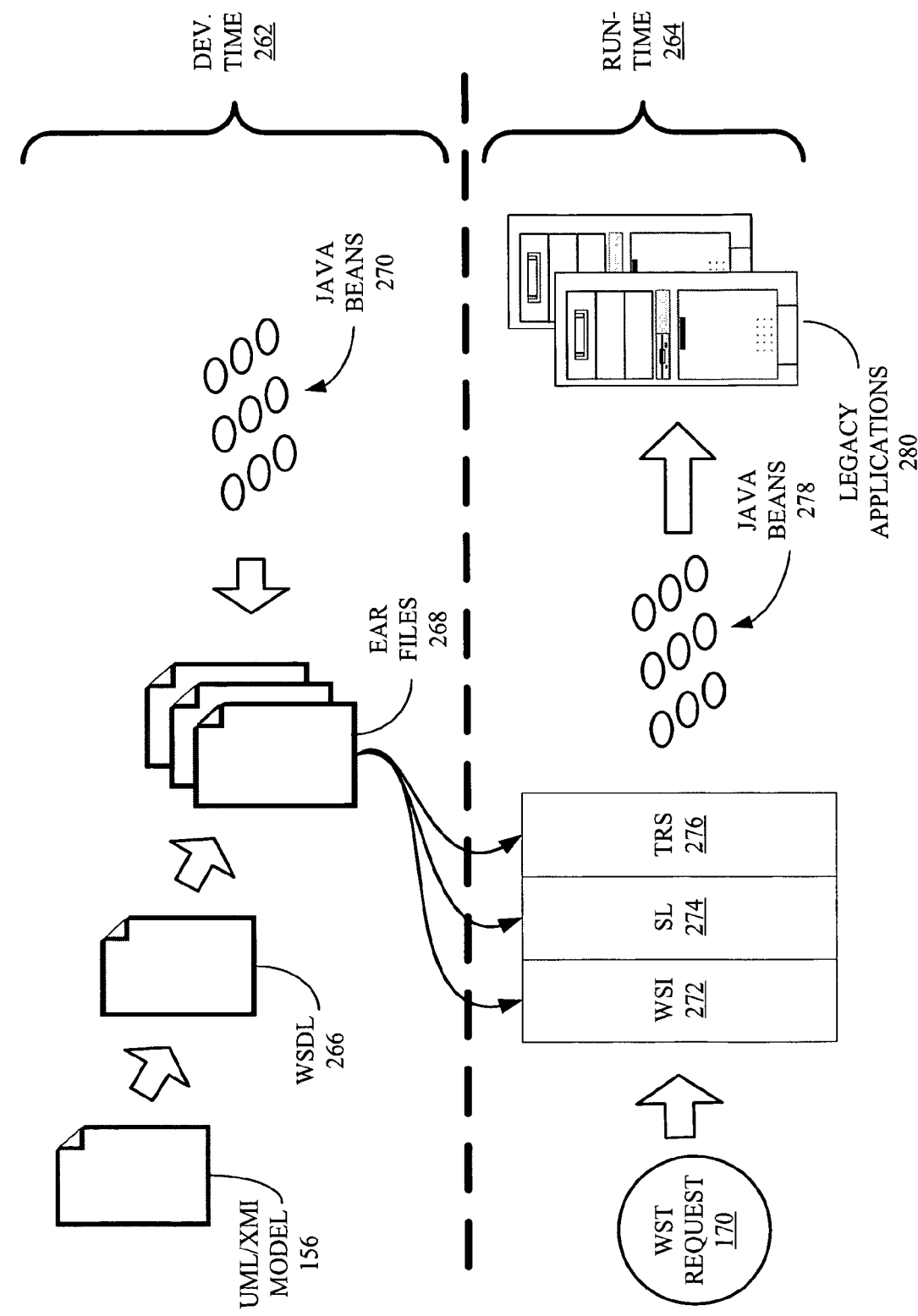
FIG. 6 is a block diagram of a server-side programming pattern for the WSRTs of the claimed subject matter.

FIG. 6 is a block diagram of a server-side programming pattern for the WSRTs of the claimed subject matter. Like shown above in conjunction with FIG. 2, during a development time 262, UML/XMI model 156 (FIG. 2) is employed to generate a WSDL document 266. WSDL document 266 is then employed, in conjunction with standard WSDL support tools such as JavaBeans 270 to generate Enterprise Archive (EAR) files 268. Typically, a skeletal version of Javabeans 270 is provided with system 260 and web service developers complete JavaBeans 270 with code customized for the particular web service.

JavaBeans 270 are self-contained software components that can be controlled dynamically and assembled to form software applications. In this example, JavaBeans 270 are typically generated by the provider, or web server, side developers.

During a run-time 264, WST request 170 (FIG. 2) is transmitted to server provider 172 (FIG. 2) from the client-side 150 (FIG. 2). WST request 170 is processed, or "filled in," by standard web service components, in this example, a WS invocation 272, a service logic component 274 and a template runtime support component, or "navigator," 276. WS invocation 272 receives WST request 170 and invokes service logic component 274 and navigator 276. WST request 170 is processed in conjunction with appropriate EAR files 268, which have a complete EAR implementation, and javaBeans 278 to produce web service requests that legacy applications 280 are able to process.

The following code illustrates one exemplary, invocation of service logic component 274:

```
// Implement the logic of the Service operation
Object account = getAccountData("123");
```

In this example, an account and data in the account is being accessed. Of course, other types of service operations may be invoked.

The following code illustrates one exemplary, invocation of navigator 276:

```
// Fill in the template and return
return Navigator.navigate(accountTemplate,account,context);
```

Navigator 276 is an automated process that collects data requested in WST request 170, fills a corresponding response template in conjunction with java beans 278 and transmites the response template back to the requestor. Navigator 276 may also verify the requestor and validate the request.

The following illustrates what a "filled-in" response template might look like based on the example described above in FIGS. 1-6.

```
<account xmlns="http://trade.awsdc.ibm.com">
    <accountID
xmlns="http://response.trade.awsdc.ibm.com">123</accountID>
    <creationDate xmlns="http://response.trade.awsdc.ibm.com">2004-09-
16</creationDate>
    <accountProfile xmlns="http://response.trade.awsdc.ibm.com">
        <userID>user123</userID>
        <password>8888</password>
        <email>123@email.com</email>
        <creditCard>this is account 123 credit card</creditCard>
    </accountProfile>
    <bankingAccountsByType
xmlns="http://response.trade.awsdc.ibm.com">
        <bankingAccountsByTypeFilter>
            <bankingAccountsByTypeFilterParam>
                <type>REGULAR</type>
            </bankingAccountsByTypeFilterParam>
            <bankingAccountTemplate>
                <number>0</number>
                <description>this is account:123's
bankingAccount</description>
                <transactions>
                    <transactionTemplate>
                        <transactionID>1</transactionID>
                        <date>2004-06-16</date>
                        <type>Transaction1</type>
                        <value>1000.0</value>
                    </transactionTemplate>
                </transactions>
                ...
            </bankingAccountTemplate>
        </bankingAccountsByTypeFilter>
    </bankingAccountsByType>
</account>
```

Figure 7:
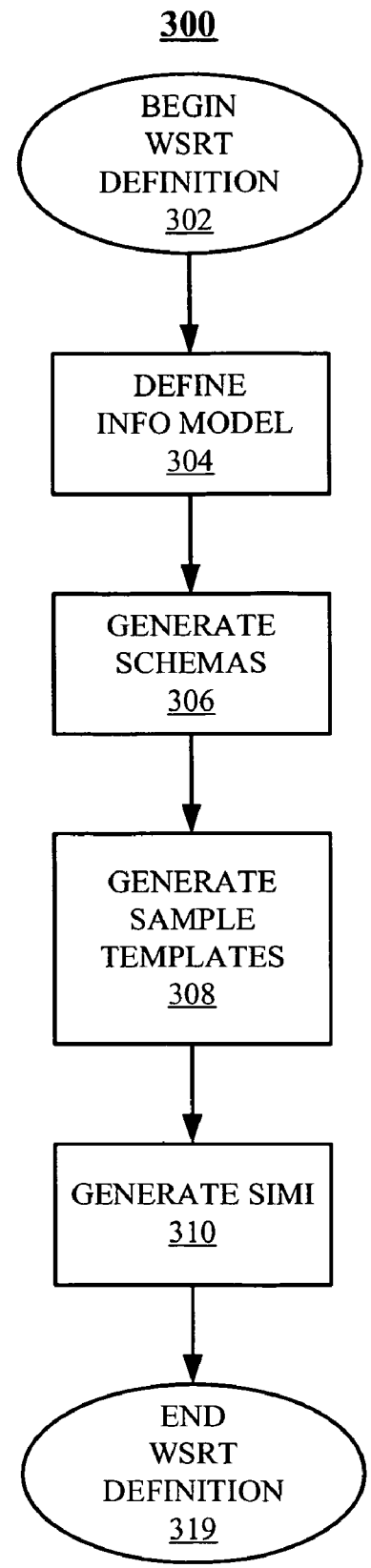
FIG. 7 is flow chart that illustrates an exemplary definition process for implementing the claimed subject matter.
Figure 8:
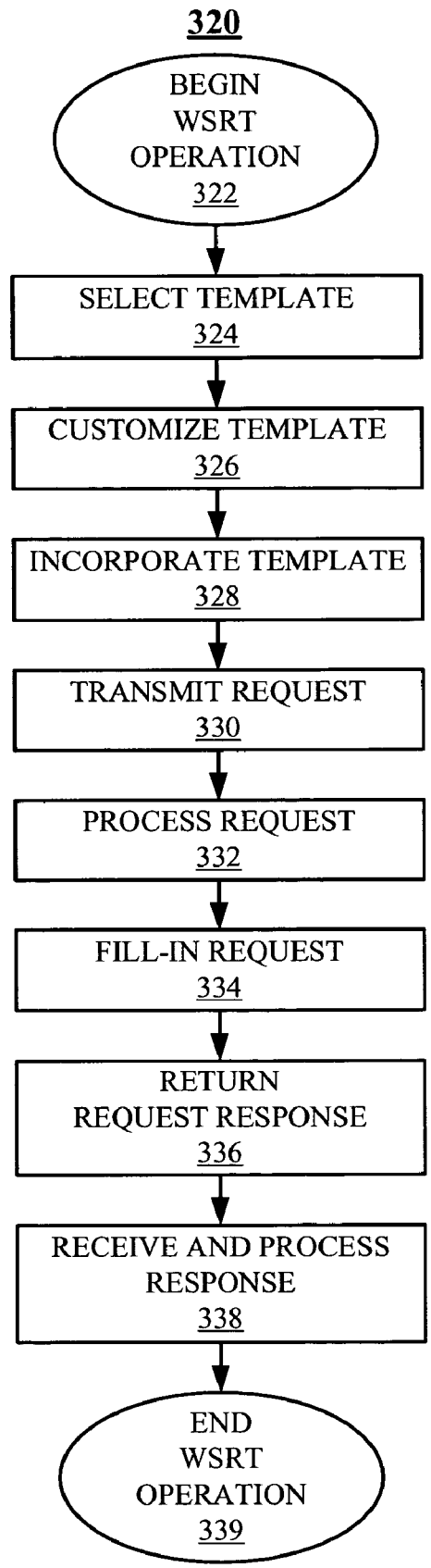
FIG. 8 is a flow chart that illustrates an exemplary operation process of the claimed subject matter.

FIG. 7 is flow chart that illustrates an exemplary WST definition process 300 for implementing the claimed subject matter. It should be understood that process 300 and an operation process 320 (see FIG. 8) include blocks that are executed by either client side 150 (FIG. 2), server side 260 (FIG. 6) or both. Both FIGS. 7 and 8 present an overall picture of the claimed subject matter as described above in conjunction with FIGS. 1-6.

Process 300 starts in a "Begin WSRT Definition" block 302 and proceeds immediately to a "Define Information Model" block 304. During block 304, a service provider defines an information model, such as UML information model 100 (FIG. 1). During a "Generate Schemas" block 306, process 300 generates XML schemas, such as XML schema 158, based upon the information model developed during block 304.

The following code segment is an example of an XML schema based upon information model 100:

```
<?xml version="1.0" encoding="UTF-8"?>
<wsdl:definitions name="trade" targetNamespace="http://trade.awsdc.ibm.com"
xmlns:wsdl="http://schemas.xmlsoap.org/wsdl/"
xmlns:xsd="http://www.w3.org/2001/XMLSchema"
xmlns:soap="http://schemas.xmlsoap.org/wsdl/soap/"
xmlns:trade="http://trade.awsdc.ibm.com" xmlns="http://schemas.xmlsoap.org/wsdl/">
    <wsdl:types>
        <xsd:schema elementFormDefault="qualified"
targetNamespace="http://trade.awsdc.ibm.com"
xmlns:request="http://request.trade.awsdc.ibm.com"
xmlns:response="http://response.trade.awsdc.ibm.com"
xmlns:trade="http://trade.awsdc.ibm.com"
xmlns:xsd="http://www.w3.org/2001/XMLSchema">
            <xsd:import namespace="http://request.trade.awsdc.ibm.com"
schemaLocation="trade_request.xsd"/>
            <xsd:import namespace="http://response.trade.awsdc.ibm.com"
schemaLocation="trade_response.xsd"/>
            <xsd:element name="getBankingAccounts">
                <xsd:complexType>
                    <xsd:all>
                        <xsd:element name="userID" type="xsd:string"/>
                        <xsd:element name="bankingAccountTemplate"
type="request:BankingAccount"/>
                    </xsd:all>
                </xsd:complexType>
            </xsd:element>
            <xsd:element name="getBankingAccountsResponse">
                <xsd:complexType>
                    <xsd:sequence>
                        <xsd:element maxOccurs="unbounded"
name="bankingAccount" type="response:BankingAccount"/>
                    </xsd:sequence>
                </xsd:complexType>
            </xsd:element>
            <xsd:element name="getAccount">
                <xsd:complexType>
                    <xsd:all>
                        <xsd:element name="userID" type="xsd:string"/>
                        <xsd:element name="accountTemplate"
type="request:Account"/>
                    </xsd:all>
                </xsd:complexType>
            </xsd:element>
            <xsd:element name="getAccountResponse">
                <xsd:complexType>
                    <xsd:sequence>
                        <xsd:element maxOccurs="1" name="account"
type="response:Account"/>
                    </xsd:sequence>
                </xsd:complexType>
            </xsd:element>
        </xsd:schema>
    </wsdl:types>
    <wsdl:message name="getBankingAccountsDataResponse">
        <wsdl:part name="output" element="trade:getBankingAccountsResponse"/>
    </wsdl:message>
    <wsdl:message name="getAccountDataResponse">
        <wsdl:part name="output" element="trade:getAccountResponse"/>
    </wsdl:message>
    <wsdl:message name="getAccountDataRequest">
        <wsdl:part name="input" element="trade:getAccount"/>
    </wsdl:message>
    <wsdl:message name="getBankingAccountsDataRequest">
        <wsdl:part name="input" element="trade:getBankingAccounts"/>
    </wsdl:message>
```

-continued

```
<wsdl:portType name="TradePortType">
  <wsdl:operation name="getBankingAccounts">
    <wsdl:input message="trade:getBankingAccountsDataRequest"/>
    <wsdl:output message="trade:getBankingAccountsDataResponse"/>
  </wsdl:operation>
  <wsdl:operation name="getAccount">
    <wsdl:input message="trade:getAccountDataRequest"/>
    <wsdl:output message="trade:getAccountDataResponse"/>
  </wsdl:operation>
</wsdl:portType>
<wsdl:binding name="TradeBinding" type="trade:TradePortType">
  <soap:binding style="document" transport="http://schemas.xmlsoap.org/soap/http"/>
  <wsdl:operation name="getBankingAccounts">
    <soap:operation soapAction=""/>
    <wsdl:input>
      <soap:body use="literal"/>
    </wsdl:input>
    <wsdl:output>
      <soap:body use="literal"/>
    </wsdl:output>
  </wsdl:operation>
  <wsdl:operation name="getAccount">
    <soap:operation soapAction=""/>
    <wsdl:input>
      <soap:body use="literal"/>
    </wsdl:input>
    <wsdl:output>
      <soap:body use="literal"/>
    </wsdl:output>
  </wsdl:operation>
</wsdl:binding>
<wsdl:service name="Trade">
  <wsdl:port name="Trade" binding="trade:TradeBinding">
    <soap:address location="http://localhost:9080/Trade/services/Trade"/>
  </wsdl:port>
</wsdl:service>
</wsdl:definitions>
```

During a "Generate Sample Templates" block 308, process 300, in WSDL 266 (FIG. 6), employs the schemas generated during block 306 to specify exactly what templates are legal within the system and what a response will look like and then generates samples based upon that determination. During a "Generate Skeleton Information Model Implementation (SIMI)" block 310, process 300 defines a basic model for controlling the modification, during runtime, of sample templates generated during block 308.

The following is an example of a request template schema based upon the XML schema illustrated above:

```
<?xml version="1.0" encoding="UTF-8"?>
<xsd:schema attributeFormDefault="qualified"
    elementFormDefault="qualified"
    targetNamespace="http://request.trade.awsdc.ibm.com"
    xmlns="http://request.trade.awsdc.ibm.com"
    xmlns:xsd="http://www.w3.org/2001/XMLSchema">
  <xsd:complexType name="Select" />
```

<!--Notes: We do not use the xsd;anyType for typing this simple-type elements because, with JAX-RPC serializer, there is an additional attribute that are included in the resulting XML such as the xsi:type. This additional attribute is not required to process the request so, in order to limit the size of the xml stream, we do not use this solution the complexType Select is used for this.-->

```
<xsd:complexType name="Account">
  <xsd:all>
    <xsd:element minOccurs="0" name="accountID"
        type="Select" />
    <xsd:element minOccurs="0" name="creationDate"
        type="Select" />
    <xsd:element minOccurs="0" name="accountProfile"
        type="AccountProfile" />
    <xsd:element minOccurs="0" name="bankingAccounts">
      <xsd:complexType>
        <xsd:sequence>
          <xsd:element name="bankingAccountTemplate"
              type="BankingAccount" />
        </xsd:sequence>
      </xsd:complexType>
    </xsd:element>
    <xsd:element minOccurs="0" name="bankingAccountsByType">
      <xsd:complexType>
        <xsd:sequence>
          <!-- Notes: we are not using xsd:sequence maxOccurs="unbounded" here -->
          <xsd:element
              name="bankingAccountsByTypeFilter" maxOccurs="unbounded">
            <xsd:complexType>
              <xsd:sequence>
                <xsd:element
                    name="bankingAccountsByTypeFilterParam">
                  <xsd:complexType>
                    <xsd:all>
                      <xsd:element name="type"
                          type="BankingAccountType" />
                    </xsd:all>
                  </xsd:complexType>
                </xsd:element>
                <xsd:element
```

-continued

```
name="bankingAccountTemplate"
  type="BankingAccount" />
             </xsd:sequence>
          <xsd:complexType>
        </xsd:element>
      </xsd:sequence>
    </xsd:complexType>
  </xsd:element>
 </xsd:all>
</xsd:complexType>
<xsd:complexType name="BankingAccount">
  <xsd:all>
    <xsd:element minOccurs="0" name="type"
      type="Select" />
    <xsd:element minOccurs="0" name="number"
      type="Select" />
    <xsd:element minOccurs="0" name="description"
      type="Select" />
    <xsd:element minOccurs="0" name="transactions">
      <xsd:complexType>
        <xsd:sequence>
          <xsd:element name="transactionTemplate"
             type="Transaction" />
        </xsd:sequence>
      </xsd:complexType>
    </xsd:element>
    <xsd:element minOccurs="0" name="transactionsByDate">
      <xsd:complexType>
        <xsd:sequence>
          <!-- Notes: we are not using xsd:sequence
maxOccurs="unbounded" here -->
          <xsd:element name="transactionsByDateFilter"
maxOccurs="unbounded">
            <xsd:complexType>
              <xsd:sequence>
                <xsd:element
name="transactionsByDateFilterParam">
                  <xsd:complexType>
                    <xsd:all>
<xsd:element name="fromDate"
type="xsd:date" />
<xsd:element name="toDate"
type="xsd:date" />
                    </xsd:all>
                  </xsd:complexType>
                </xsd:element>
                <xsd:element
name="transactionTemplate"
                  type="Transaction" />
              </xsd:sequence>
            </xsd:complexType>
          </xsd:element>
        </xsd:sequence>
      </xsd:complexType>
    </xsd:element>
  </xsd:all>
</xsd:complexType>
<xsd:complexType name="AccountProfile">
  <xsd:all>
    <xsd:element minOccurs="0" name="userID"
      type="Select" />
    <xsd:element minOccurs="0" name="password"
      type="Select" />
    <xsd:element minOccurs="0" name="address"
      type="Select" />
    <xsd:element minOccurs="0" name="fullName"
      type="Select" />
    <xsd:element minOccurs="0" name="email"
      type="Select" />
    <xsd:element minOccurs="0" name="creditCard"
      type="Select" />
  </xsd:all>
</xsd:complexType>
<xsd:complexType name="Transaction">
  <xsd:all>
    <xsd:element minOccurs="0" name="transactionID"
      type="Select" />
    <xsd:element minOccurs="0" name="date"
      type="Select" />
    <xsd:element minOccurs="0" name="description"
      type="Select" />
    <xsd:element minOccurs="0" name="type"
      type="Select" />
    <xsd:element minOccurs="0" name="value"
      type="Select" />
  </xsd:all>
</xsd:complexType>
<xsd:simpleType name="BankingAccountType">
  <xsd:restriction base="xsd:string">
    <xsd:enumeration value="REGULAR" />
    <xsd:enumeration value="SAVING" />
    <xsd:enumeration value="STOCK" />
  </xsd:restriction>
</xsd:simpleType>
</xsd:schema>
```

The following is an example of a response template schema based upon the XML schema illustrated above:

```
<?xml version="1.0" encoding="UTF-8"?>
<xsd:schema attributeFormDefault="qualified"
elementFormDefault="qualified"
targetNamespace="http://response.trade.awsdc.ibm.com"
xmlns="http://response.trade.awsdc.ibm.com"
xmlns:xsd="http://www.w3.org/2001/XMLSchema">
  <xsd:complexType name="Account">
    <xsd:all>
      <xsd:element nillable="true" minOccurs="0" name="accountID"
type="xsd:integer" />
      <xsd:element nillable="true" minOccurs="0" name="creationDate"
type="xsd:date" />
      <xsd:element nillable="true" minOccurs="0"
        name="accountProfile"
type="AccountProfile" />
      <xsd:element minOccurs="0" name="bankingAccounts">
        <xsd:complexType>
          <xsd:sequence>
            <xsd:element minOccurs="0"
maxOccurs="unbounded" name="bankingAccountTemplate"
type="BankingAccount" />
          </xsd:sequence>
        </xsd:complexType>
      </xsd:element>
      <xsd:element minOccurs="0" name="bankingAccountsByType">
        <xsd:complexType>
          <xsd:sequence>
            <!-- Notes: we are not using xsd:sequence
maxOccurs="unbounded" here-->
            <xsd:element
name="bankingAccountsByTypeFilter" maxOccurs="unbounded">
              <xsd:complexType>
                <xsd:sequence>
                  <xsd:element
name="bankingAccountsByTypeFilterParam">
                    <xsd:complexType>
                      <xsd:all>
  <xsd:element name="type" type="BankingAccountType" />
                      </xsd:all>
                    </xsd:complexType>
                  </xsd:element>
                  <xsd:element
maxOccurs="unbounded" minOccurs="0"
name="bankingAccountTemplate" type="BankingAccount" />
                </xsd:sequence>
              </xsd:complexType>
            </xsd:element>
          </xsd:sequence>
        </xsd:complexType>
      </xsd:element>
    </xsd:all>
  </xsd:complexType>
  <xsd:complexType name="BankingAccount">
    <xsd:all>
      <xsd:element nillable="true" minOccurs="0" name="type"
```

-continued

```
type="BankingAccountType" />
       <xsd:element nillable="true" minOccurs="0" name="number"
type="xsd:integer" />
       <xsd:element nillable="true" minOccurs="0" name="description"
type="xsd:string" />
       <xsd:element minOccurs="0" name="transactions">
          <xsd:complexType>
             <xsd:sequence>
                <xsd:element minOccurs="0"
maxOccurs="unbounded" name="transactionTemplate"
type="Transaction" />
             </xsd:sequence>
          </xsd:complexType>
       </xsd:element>
       <xsd:element minOccurs="0" name="transactionsByDate">
          <xsd:complexType>
             <xsd:sequence>
                <!-- Notes: we are not using xsd:sequence
maxOccurs="unbounded" here-->
                <xsd:element name="transactionsByDateFilter"
maxOccurs="unbounded">
                   <xsd:complexType>
                      <xsd:sequence>
                         <xsd:element
name="transactionsByDateFilterParam">
                            <xsd:complexType>
                               <xsd:all>
  <xsd:element name="fromDate" type="xsd:date" />
  <xsd:element name="toDate" type="xsd:date" />
                               </xsd:all>
                            </xsd:complexType>
                         </xsd:element>
                         <xsd:element
maxOccurs="unbounded" minOccurs="0" name="transactionTemplate"
type="Transaction" />
                      </xsd:sequence>
                   </xsd:complexType>
                </xsd:element>
             </xsd:sequence>
          </xsd:complexType>
       </xsd:element>
    </xsd:all>
 </xsd:complexType>
 <xsd:complexType name="AccountProfile">
    <xsd:all>
       <xsd:element nillable="true" minOccurs="0" name="userID"
type="xsd:string" />
       <xsd:element nillable="true" minOccurs="0" name="password"
type="xsd:string" />
       <xsd:element nillable="true" minOccurs="0" name="address"
type="xsd:string" />
       <xsd:element nillable="true" minOccurs="0" name="fullName"
type="xsd:string" />
       <xsd:element nillable="true" minOccurs="0" name="email"
type="xsd:string" />
       <xsd:element nillable="true" minOccurs="0" name="creditCard"
type="xsd:string" />
    </xsd:all>
 </xsd:complexType>
 <xsd:complexType name="Transaction">
    <xsd:all>
       <xsd:element nillable="true" minOccurs="0"
       name="transactionID"
type="xsd:integer" />
       <xsd:element nillable="true" minOccurs="0" name="date"
type="xsd:date" />
       <xsd:element nillable="true" minOccurs="0" name="description"
type="xsd:string" />
       <xsd:element nillable="true" minOccurs="0" name="type"
type="xsd:string" />
       <xsd:element nillable="true" minOccurs="0" name="value"
type="xsd:double" />
    </xsd:all>
 </xsd:complexType>
 <xsd:simpleType name="BankingAccountType">
    <xsd:restriction base="xsd:string">
       <xsd:enumeration value="REGULAR" />
       <xsd:enumeration value="SAVING" />
       <xsd:enumeration value="STOCK" />
```

-continued

```
    </xsd:restriction>
 </xsd:simpleType>
</xsd:schema>
```

Finally, process 300 proceeds to an "End WSRT Definition" block 319 during which the definition phase of the claimed subject matter is complete.

FIG. 8 is a flow chart that illustrates an exemplary WST operation process 320 that implements the claimed subject matter. Process 320 starts in a "Begin WSRT Operation" block and proceeds immediately to a "Select Template" block 324 during which the requester selects one of the templates created during Generate Sample Templates block 308 (FIG. 7). During block 324, a client, or requester, selects an appropriate template instance 168 (FIG. 2) from template factory 166. The selection of a particular template instance 168 is determined by templates defined by the targeted service provider 172 (FIG. 2) during block 308 and the particular information that the client is requesting. During a "Customize Template" block 326, the client customizes template 168 to specify the specific information the client is requesting based upon the particular information the client is requesting. During an "Incorporate Template" block 328, process 320 incorporates the selected and customized template into WST request 170 (FIG. 2), typically an XML message, for transmission to a targeted web service provider.

The following is an example of a request template, based upon the request template schema illustrated above, that incorporates specific data requests:

```
<?xml version="1.0" encoding="UTF-8"?>
<soapenv:Envelope xmlns:soapenv="http://schemas.xmlsoap.org/
soap/envelope/"
xmlns:soapenc="http://schemas.xmlsoap.org/soap/encoding/"
xmlns:xsd="http://www.w3.org/2001/XMLSchema"
xmlns:xsi="http://www.w3.org/2001/XMLSchema-instance">
 <soapenv:Body>
   <getAccount xmlns="http://trade.awsdc.ibm.com">
      <userID>123</userID>
      <accountTemplate>
        <accountID xmlns="http://request.trade.awsdc.ibm.com" />
        <creationDate xmlns="http://request.trade.awsdc.ibm.com" />
        <accountProfile xmlns="http://request.trade.awsdc.ibm.com">
           <userID />
           <password />
           <email />
           <creditCard />
        </accountProfile>
        <bankingAccountsByType
xmlns="http://request.trade.awsdc.ibm.com">
           <bankingAccountsByTypeFilter>
              <bankingAccountsByTypeFilterParam>
                 <type>REGULAR</type>
              </bankingAccountsByTypeFilterParam>
              <bankingAccountTemplate>
                 <number />
                 <description />
                 <transactions>
                    <transactionTemplate>
                       <transactionID />
                       <date />
                       <type />
                       <value />
                    </transactionTemplate>
                 </transactions>
              </bankingAccountTemplate>
           </bankingAccountsByTypeFilter>
        </bankingAccountsByType>
     </accountTemplate>
```

```
        </getAccount>
    </soapenv:Body>
</soapenv:Envelope>
```

During a "Transmit Request" block 330, the client sends WST request 170 to the targeted service provider 172. During a "Process Request" block 332, the targeted web service provider, after receiving the request, extracts the customized template from WST request 170. During a "Fill-In Request" block 334, service provider 172 fills in the template, incorporates the template within a WST response (not shown) using common utility components such as components 272, 274, 276 and 278 (FIG. 6) with the requested information.

The following is an example of a response template, based upon the response template schema illustrated above, that incorporates the data requested in the request template illustrated above:

```
<?xml version="1.0" encoding="UTF-8"?>
<soapenv:Envelope xmlns:soapenv="http://schemas.xmlsoap.org/soap/envelope/"
xmlns:soapenc="http://schemas.xmlsoap.org/soap/encoding/"
xmlns:xsd="http://www.w3.org/2001/XMLSchema"
xmlns:xsi="http://www.w3.org/2001/XMLSchema-instance">
    <soapenv:Body>
        <getAccountResponse xmlns="http://trade.awsdc.ibm.com">
            <account xmlns="http://trade.awsdc.ibm.com">
                <accountID xmlns="http://response.trade.awsdc.ibm.com">123</accountID>
                <creationDate xmlns="http://response.trade.awsdc.ibm.com">2004-09-16</creationDate>
                <accountProfile xmlns="http://response.trade.awsdc.ibm.com">
                    <userID>user123</userID>
                    <password>8888</password>
                    <email>123@email.com</email>
                    <creditCard>this is account 123 credit card</creditCard>
                </accountProfile>
                <bankingAccountsByType xmlns="http://response.trade.awsdc.ibm.com">
                    <bankingAccountsByTypeFilter>
                        <bankingAccountsByTypeFilterParam>
                            <type>REGULAR</type>
                        </bankingAccountsByTypeFilterParam>
                        <bankingAccountTemplate>
                            <number>0</number>
                            <description>this is account:123's bankingAccount</description>
                            <transactions>
                                <transactionTemplate>
                                    <transactionID>0</transactionID>
                                    <date>2004-06-15</date>
                                    <type>Transaction0</type>
                                    <value>0.0</value>
                                </transactionTemplate>
                                <transactionTemplate>
                                    <transactionID>1</transactionID>
                                    <date>2004-06-16</date>
                                    <type>Transaction1</type>
                                    <value>1000.0</value>
                                </transactionTemplate>
                                <transactionTemplate>
                                    <transactionID>2</transactionID>
                                    <date>2004-06-18</date>
                                    <type>Transaction2</type>
                                    <value>2000.0</value>
                                </transactionTemplate>
                                <transactionTemplate>
                                    <transactionID>3</transactionID>
                                    <date>2004-06-21</date>
                                    <type>Transaction3</type>
                                    <value>3000.0</value>
                                </transactionTemplate>
                                <transactionTemplate>
                                    <transactionID>4</transactionID>
                                    <date>2004-06-25</date>
                                    <type>Transaction4</type>
                                    <value>4000.0</value>
                                </transactionTemplate>
                            </transactions>
                        </bankingAccountTemplate>
                        <bankingAccountTemplate>
                            <number>3</number>
                            <description>this is account:123's bankingAccount</description>
                            <transactions>
                                <transactionTemplate>
                                    <transactionID>0</transactionID>
                                    <date>2004-06-15</date>
                                    <type>Transaction0</type>
                                    <value>0.0</value>
                                </transactionTemplate>
                                <transactionTemplate>
                                    <transactionID>1</transactionID>
                                    <date>2004-06-16</date>
                                    <type>Transaction1</type>
                                    <value>1000.0</value>
                                </transactionTemplate>
                                <transactionTemplate>
                                    <transactionID>2</transactionID>
                                    <date>2004-06-18</date>
                                    <type>Transaction2</type>
                                    <value>2000.0</value>
                                </transactionTemplate>
                                <transactionTemplate>
                                    <transactionID>3</transactionID>
                                    <date>2004-06-21</date>
                                    <type>Transaction3</type>
                                    <value>3000.0</value>
                                </transactionTemplate>
                                <transactionTemplate>
                                    <transactionID>4</transactionID>
                                    <date>2004-06-25</date>
                                    <type>Transaction4</type>
                                    <value>4000.0</value>
                                </transactionTemplate>
                            </transactions>
                        </bankingAccountTemplate>
                        <bankingAccountTemplate>
                            <number>6</number>
                            <description>this is account:123's bankingAccount</description>
                            <transactions>
                                <transactionTemplate>
                                    <transactionID>0</transactionID>
                                    <date>2004-06-15</date>
                                    <type>Transaction0</type>
                                    <value>0.0</value>
                                </transactionTemplate>
                                <transactionTemplate>
                                    <transactionID>1</transactionID>
                                    <date>2004-06-16</date>
                                    <type>Transaction1</type>
                                    <value>1000.0</value>
                                </transactionTemplate>
                                <transactionTemplate>
                                    <transactionID>2</transactionID>
                                    <date>2004-06-18</date>
                                    <type>Transaction2</type>
                                    <value>2000.0</value>
                                </transactionTemplate>
                                <transactionTemplate>
                                    <transactionID>3</transactionID>
                                    <date>2004-06-21</date>
                                    <type>Transaction3</type>
                                    <value>3000.0</value>
                                </transactionTemplate>
                                <transactionTemplate>
                                    <transactionID>4</transactionID>
                                    <date>2004-06-25</date>
                                    <type>Transaction4</type>
                                    <value>4000.0</value>
```

```
                </transactionTemplate>
            </transactions>
        </bankingAccountTemplate>
        <bankingAccountTemplate>
            <number>9</number>
            <description>this is account:123's
bankingAccount</description>
            <transactions>
                <transactionTemplate>
<transactionID>0</transactionID>
                    <date>2004-06-15</date>
                    <type>Transaction0</type>
                    <value>0.0</value>
                </transactionTemplate>
                <transactionTemplate>
<transactionID>1</transactionID>
                    <date>2004-06-16</date>
                    <type>Transaction1</type>
                    <value>1000.0</value>
                </transactionTemplate>
                <transactionTemplate>
<transactionID>2</transactionID>
                    <date>2004-06-18</date>
                    <type>Transaction2</type>
                    <value>2000.0</value>
                </transactionTemplate>
                <transactionTemplate>
<transactionID>3</transactionID>
                    <date>2004-06-21</date>
                    <type>Transaction3</type>
                    <value>3000.0</value>
                </transactionTemplate>
                <transactionTemplate>
<transactionID>4</transactionID>
                    <date>2004-06-25</date>
                    <type>Transaction4</type>
                    <value>4000.0</value>
                </transactionTemplate>
            </transactions>
        </bankingAccountTemplate>
      </bankingAccountsByTypeFilter>
    </bankingAccountsByType>
  </account>
 </getAccountResponse>
</soapenv:Body>
</soapenv:Envelope>
```

During a "Return Request Response" block 236, service provider 172 transmits the filled-in template within the WST response back to the requesting client. During a "Receive and Process Response" block 338, the client that transmitted WST request 170 receives the WST response and extracts and processes the requested information. Finally, during an "End WSRT Operation" block 339, process 320 is complete.

Some important characteristics of the claimed subject matter are as follows:

Schemas fully "type" a request and response form of the template which allows the request and response to be validated;

No extensions are required to Web Services standards; and

Web Services Response Templates are fully compatible with existing Web Services standards.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for transferring data between a client computer and a web service, comprising:

defining a template schema, based upon an information model, wherein the information model characterizes web service data and the web service data is data delivered by the web service;

defining a plurality of request templates, each template of the plurality of template corresponding to a particular subset of the web service data and consistent with the template schema;

selecting a particular request template of the plurality of request templates;

customizing the particular request template based upon specific information requirements of a requestor to generate a customized request template;

collecting the subset of web service data specified in the customized request template;

generating a response template consistent with the template schema and the customized request template, wherein the subset of web service data is incorporated into the response template; and transmitting the response template, including the incorporated subset of web service data, from the web service to the client computer.

2. The method of claim 1, wherein the template schema is expressed in extensible markup language (XML) Schema.

3. The method of claim 2, wherein the plurality of request templates and the response template are strongly typed using the XML template schema.

4. The method of claim 1, wherein the information model is based upon unified modeling language (UML).

5. The method of claim 1, wherein the template schema is defined using web services description language (WSDL) and the request template and plurality of response templates employ simple object access protocol (SOAP).

6. The method of claim 1, further comprising verifying that a customized request template is from an authorized transmitter.

7. A method for specifying information transfer between a client computer and a web service, comprising:

defining a template schema, based upon an information model, wherein the information model characterizes web service data and the web service data is data delivered by the web service;

customizing a request template based upon specific information requirements of a requestor to generate a customized request template and consistent with the template schema, wherein the request template specifies a subset of the data associated with the web service;

generating the customized request template;

collecting the subset of data specified in the customized request template;

generating a response template consistent with the template schema and the customized request template, wherein the subset of web service data is incorporated into the response template; and transmitting the response template, including the incorporated subset of web service data, from the web service to the client computer.

8. The method of claim 7, wherein the template schema is expressed in extensible markup language (XML) Schema.

9. The method of claim 8, wherein the request template and the response template are strongly typed using the XML template schema.

10. The method of claim 7, wherein the information model is based upon unified modeling language (UML).

11. The method claim 7, wherein the template schema is defined using web services description language (WSDL).

12. The method of claim 7, further comprising verifying that the request template is from an authorized transmitter.

* * * * *